(12) United States Patent
Christanti et al.

(10) Patent No.: US 7,290,615 B2
(45) Date of Patent: Nov. 6, 2007

(54) FLUID HAVING RECYCLABLE VISCOSITY

(75) Inventors: Yenny Christanti, Houston, TX (US); Diankui Fu, Missouri City, TX (US); Jian Zhou, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 504 days.

(21) Appl. No.: 10/943,577

(22) Filed: Sep. 17, 2004

(65) Prior Publication Data

US 2006/0063681 A1     Mar. 23, 2006

(51) Int. Cl.
    *E21B 37/00* (2006.01)
(52) U.S. Cl. ...................................... 166/312
(58) Field of Classification Search ............ None
    See application file for complete search history.

(56) References Cited

U.S. PATENT DOCUMENTS

| | | | |
|---|---|---|---|
| 5,964,295 A | 10/1999 | Brown et al. ............... 166/308 |
| 6,258,859 B1 | 7/2001 | Dahayanake et al. ......... 516/77 |
| 6,435,277 B1 | 8/2002 | Qu et al. ..................... 166/281 |
| 6,482,866 B1 | 11/2002 | Dahayanake et al. ......... 516/77 |
| 6,762,154 B2 * | 7/2004 | Lungwitz et al. ........... 507/131 |
| 6,908,888 B2 * | 6/2005 | Lee et al. .................... 507/219 |

* cited by examiner

*Primary Examiner*—Jennifer H. Gay
*Assistant Examiner*—Kerry W. Leonard
(74) *Attorney, Agent, or Firm*—Darla Fonseca; David Cate; Robin Nava (57) ABSTRACT

Compositions are given that have high viscosities at one pH range and low viscosities at another pH range. Methods are given for using such compositions in oilfield treatments. In particular CT wellbore cleanout compositions and methods are given in which a viscous fluid is injected into a wellbore; the fluid entrains particles and carries them to the surface; the viscosity of the fluid is reduced by reducing or increasing the pH; the particles settle from the fluid; the viscosity of the fluid is increased by increasing or reducing the pH; and the fluid is re-injected into the wellbore. Suitable surfactants are anionic surfactants, or mixtures of surfactants containing anionic surfactants, that aggregate into three-dimensional structures that substantially increase the viscosity at high pH but not at low pH. Other suitable surfactants are cationic surfactants with co-surfactants that aggregate below a certain pH but not above.

15 Claims, 10 Drawing Sheets

FLUID HAVING RECYCLABLE VISCOSITY

BACKGROUND OF THE INVENTION

This invention relates to fluids having recyclable viscosity and their use in oilfield treatments. More particularly, it relates to compositions and methods for cleaning debris from wellbores and wellbore tubing. Even more particularly it relates to removal of drill cuttings and other contaminants from a wellbore before or after cementing or completion and to removal of particulates after stimulation and/or during production. Most particularly, it relates to methods and compositions for recycling a fluid used in such cleanout operations.

Material that has accumulated in a wellbore before or during completion is often called wellbore fill; it may be sand, proppant, cement chunks, or other materials. Such materials hinder or prevent operations. Sand accumulated in production tubing in a wellbore at the start of or during production can greatly hinder production. Coiled tubing has been widely used as a means to clean out the wellbore or production tubing in these situations. Requirements for fluids used for wellbore fill removal, more particularly "coiled tubing cleanout", include low friction pressure and good particle carrying capability. Some crosslinked polymer gels are not preferred viscosifiers for cleanout fluids because they do not have preferred viscoelastic properties for fluidizing the particles so that they can be transported. Viscoelastic Surfactant (VES) fluid systems have been successfully applied in coiled tubing cleanout applications because of their superior drag reduction and particle transport properties, but these materials are discarded after a single trip through the well. VES cleanout systems that can be recycled have not been reported, and would be highly desirable for logistical and operational reasons, especially in offshore locations. Such recyclable VES cleanout systems also give cost benefits and are environmentally friendly.

SUMMARY OF EMBODIMENTS OF THE INVENTION

One embodiment of the invention is a composition that includes an aqueous fluid, a zwitterionic surfactant and an anionic surfactant; this fluid is characterized in that the viscosity is above about 50 cP when the pH is above about 5 and the viscosity is below about 50 cP when the pH is below about 4, for example the viscosity is above about 50 cP when the pH is above about 7 and the viscosity is below about 50 cP when the pH is below about 4. The composition may contain a chelating agent for divalent or trivalent cations. In one embodiment, the zwitterionic surfactant comprises a betaine, the anionic surfactant comprises a fatty acid, and the chelating agent comprises an aminopolycarboxylic acid. The betaine may be for example erucic amidopropyl dimethyl betaine; the fatty acid may be for example oleic acid; the chelating agent may be for example ethylenediaminetetraacetate or one of its salts. Another embodiment is a composition containing a zwitterionic surfactant, an anionic surfactant and a chelating agent for divalent or trivalent cations.

Yet another embodiment is an oilfield treatment method involving repeatedly cycling the viscosity of an oilfield treatment fluid between high viscosity and low viscosity, for example by cycling the pH. One more embodiment is a method of alternating the viscosity of an aqueous viscoelastic surfactant system containing an anionic surfactant, between a first viscosity greater than about 50 cP and a second viscosity less than about 50 cP by combining the components in an aqueous fluid and alternating the pH between a first value above about 5 and a second value below about 4, for example the pH is alternated between a first value above about 7 and a second value below about 4. The aqueous viscoelastic surfactant system may optionally contain a zwitterionic surfactant.

Another embodiment is a method of cleaning particles from a wellbore involving a) injecting into the wellbore an aqueous fluid having a viscosity sufficient to entrain the particles b) moving the aqueous fluid within the wellbore such that the fluid entrains the particles, c) bringing the fluid to the surface, d) and reducing the viscosity of the fluid such that the particles settle from the fluid and e) allowing the particles to settle from the fluid. In a further embodiment the viscosity of the fluid is then increased to a viscosity sufficient to entrain particles and steps a) through e) are repeated. In one embodiment the viscosity is changed by decreasing or increasing the pH. The fluid is optionally injected through a jetting tool. The fluid is optionally injected first into the portion of the region of the wellbore to be cleaned farthest from the surface, or optionally first into the portion of the region of the wellbore to be cleaned nearest to the surface.

Another embodiment is a method of cleaning particles from a wellbore involving a) injecting into the wellbore an aqueous fluid containing an anionic surfactant, characterized in that the fluid has a viscosity of at least about 50 cP and a pH of at least about 5, b) moving the aqueous fluid within the wellbore such that the fluid entrains the particles, c) bringing the fluid to the surface, d) and reducing the pH of the fluid to below about 4 and allowing the particles to settle from the fluid. In one embodiment after step d) the pH of the fluid is increased to above about 5, and then steps a) through d) are repeated. The anionic surfactant as an example includes a fatty acid. The fatty acid as an example includes oleic acid. The fluid optionally also includes a zwitterionic surfactant, for example a betaine, for example erucic amidopropyl dimethyl betaine. The fluid optionally also includes a chelating agent for divalent or trivalent cations, for example ethylenediaminetetraacetate or one of its salts.

Yet another embodiment is a method of cleaning particles from a wellbore involving a) injecting into the wellbore an aqueous fluid containing a cationic surfactant, characterized in that the fluid has a viscosity of at least about 50 cP and a pH of less than about 8, b) moving the aqueous fluid within the wellbore such that the fluid entrains the particles, c) bringing the fluid to the surface, d) and increasing the pH of the fluid to above about 10 and allowing the particles to settle from the fluid. Optionally, after step d) the pH of the fluid is decreased to less than about 8, and then steps a) through d) are repeated. The cationic surfactant for example includes a quaternary ammonium cationic surfactant, for example erucyl bis(2-hydroxyethyl) methyl ammonium chloride. The fluid optionally contains a carboxylic acid co-surfactant, for example salicylic acid.

DETAILED DESCRIPTION OF EMBODIMENTS OF THE INVENTION

We have observed that fluid systems can be formulated with viscoelastic surfactant systems such that the surfactants aggregate into three-dimensional structures under some conditions but not under other conditions. When aggregated into these structures, for example micellar structures, for example rod-like micellar structures, these viscoelastic surfactant fluid systems are said to be gelled and have high viscosity; when not aggregated into the three-dimensional structures, the fluid systems have low viscosity. In some cases, the viscosity change may be cycled many times. That is, the status of the fluid system may be changed back and forth many times between a viscoelastic gel and a low-viscosity fluid by changing one or more factors. For example, certain surfactants, e.g. certain anionic surfactants, form viscoelastic gels at high pH but have low viscosity at low pH. Other surfactants, for example cationic surfactants with co-surfactants, form viscoelastic gels at intermediate pH but not at high pH. Thus, the viscoelasticity of formulations of these surfactants may be changed by changing the pH and may be cycled repeatedly by cycling the pH.

Other VES fluid systems may have properties that are preferred over the properties of one type of recyclable VES system, for example the anionic surfactant-based pH-recyclable VES fluid systems, but do not have recyclable viscosity, or do not provide recyclable viscosity when the preferred condition (such as pH) is changed. The desired property might be, for example, greater tolerance to high temperatures or to certain additives. Such systems may be made recyclable with the preferred condition change by the addition of amounts, sometimes small amounts, of the surfactants that do make VES fluid systems recyclable with the preferred condition change.

Certain anionic surfactants have been found to have excellent gelling properties in high pH environments but to decrease dramatically in viscosity at lower pH values. Fatty acid based viscoelastic surfactant systems have been found to be particularly suitable. For example, the fluid pH of gelled oleic acid must be greater than about 10 to provide the desired rheological, for example the ability to pick up and transport wellbore particles, but the fluid viscosity decreases to values low enough that such particles may be easily removed when the pH drops below a critical value of about 4. This change in rheological behavior may be repeated many times with successive pH adjustments.

In accordance with one presently preferred embodiment of this invention, the anionic surfactant is employed as the free acid or as the sodium, potassium, or ammonium salt. Examples of suitable anionic surfactants include polyalkoxy carboxylic acids, acylated protein hydrolysates, N-acylsarcosinates, alkyl carboxylic acids, cycloalkyl carboxylic acids, aryl carboxylic acids, alkyl phosphates, alkyl thiophosphates, alkyl polyphosphates, and ethoxylated phosphate esters. Suitable anionic surfactants aggregate into three-dimensional structures that substantially increase the viscosity at high pH but not at low pH.

Further examples of suitable anionic surfactants are carboxylic acids having the generic structure:

wherein R represents alkyl, alkenyl, arylalkyl, and hydroxyalkyl wherein each of said alkyl groups contains from about 8 to about 24 carbon atoms, more preferably at least 16 carbon atoms, and may be branched or straight chained and saturated or unsaturated, and wherein when branched the branch alkyl groups have from about 1 to about 6 carbon atoms. Representative of alkyl groups for R include decyl, dodecy, tetradecyl (myristyl), hexadecyl (cetyl), octadecyl (oleyl), lauryl, palmityl, stearyl, erucyl, and the derivatives of coco, tallow, soya, and rapeseed oils. Dimers of unsaturated acids may also be used, such as oleic acid dimer. The R groups may be substituted with other groups provided that the common unifying factor, that these surfactants aggregate into three-dimensional structures that substantially increase the viscosity at high pH but do not aggregate into three-dimensional structures that substantially increase the viscosity at low pH, is not lost.

Another suitable class of anionic surfactants is ethoxylated anionic surfactants of the general formula:

having an alkyl chain R of from about 6 to about 30 carbon atoms, that can be straight chained or branched, and saturated or unsaturated, and a value of n from 0 to about 20, preferably less than about 10. The cation is inorganic (for example $K^+$, $Na^+$, and $Cs^+$) or organic (for example quaternary amine). An example is sodium laureth-13 carboxylate, sold by Rhodia, Inc. Cranbury, N.J., U.S.A. under the trade name Miranate LEC-80, and hereinafter referred to as "LEC". LEC has a $C_{12}$ straight chained alkyl group, 13 ethoxy groups and a sodium cation. As received, Miranate LEC-80 is about 79% active ingredient and also contains mixed alcohol and water.

A suitable pH for aggregation of anionic surfactants with carboxylate head groups is above about 5, for example above about 7, and as another example above about 9. The exact pH for each specific anionic surfactant at a given concentration and temperature, and with given other materials present, can be determined by simple experiments. When anionic surfactants having carboxyl groups are used with salts containing multivalent inorganic cations such as magnesium, calcium or zinc, a chelating agent effective for chelating multivalent inorganic cations may be added. The need for, and necessary amount of, such chelating agent may also be determined easily by simple experiments.

Many cations that may be present in oilfield waters may interfere with the performance of, or even precipitate, many anionic surfactants. This is prevented by the incorporation into the formulation of a suitable chelating agent, for example, but not limited to, ethylenediaminetetraacetic acid or its salts.

Mixed surfactant systems may be used in which one surfactant provides recyclable reversible viscosity and one or more other surfactants provide other properties. For example, many zwitterionic surfactants make VES fluid systems that do not display viscosity recyclable with pH but that have other very desirable properties (such as higher gel thermal stability and greater gel salt tolerance). We have found that these surfactants may be made recyclable by pH changes by the addition of the anionic surfactants describe above. Non-limiting examples of such zwitterionic surfactants can be found in U.S. Pat. No. 6,482,866, hereby incorporated by reference in its entirety. These materials may also contain co-surfactants, salts, low-molecular weight alcohols and other additives to enhance gel strength and stability, as described in the above reference. One valuable property is that zwitterionic surfactant fluids tend to be insensitive to salt concentrations and types and can be used in water ranging from fresh water to heavy brines. The gelled systems may be foamed, for example with nitrogen, to reduce the fluid density and thus to reduce leakoff into the formation. (Generally carbon dioxide is not used for foaming these systems because it lowers the pH and reduce the viscosity.) Additionally, the surfactants and the gels are compatible with other appropriate oilfield fluid additives such as iron control additives, antioxidants, anti-sludge agents, corrosion inhibitors, clay control agents, flow enhancers and scale inhibitors. As with all oilfield treatment fluids, surfactants and additives should always be tested to ensure that the fluids perform as desired and that the additives do not interfere with the performance or cause problems before, during, or after the treatment. Such testing is well known to those of skill in the art.

Preferred zwitterionic surfactants have the following amide structure:

in which $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 5 carbon atoms; and Y is an electron withdrawing group. Preferably the electronic withdrawing group is a quaternary amine or an amine oxide.

More preferably the surfactant is a betaine having the structure:

in which R is a hydrocarbyl group that may be branched or straight chained, aromatic, aliphatic or olefinic and has from about 14 to about 26 carbon atoms and may contain an amine; n=about 2 to about 10, preferably about 2 to about 4; and p=1 to about 5, preferably 1 to 3, and mixtures of these compounds. Even more preferably the surfactant is a betaine in which R is $C_{17}H_{33}$ or $C_{21}H_{41}$, and n=3 and p=1; these are called BET-O-30 and BET-E-40 respectively, and are shown below. Most preferably the surfactant is BET-E-40.

Surfactant in BET-O-30 (when n=3 and p=1)

Surfactant in BET-E-40 (when n=3 and p=1)

BET-O-30 is so designated because as obtained from the supplier (Rhodia, Inc. Cranbury, N.J., U.S.A.) it is called Mirataine BET-O-30 because it contains an oleyl acid ester group (including a $C_{17}H_{33}$ tail group) and contains about 30% active surfactant; the remainder is substantially water, sodium chloride, glycerol and propane-1,2-diol. The analogous material, BET-E-40, is also available from Rhodia and contains a erucic acid ester group (including a $C_{21}H_{41}$ tail group) and is 40% active ingredient, with the remainder substantially water, a small amount of sodium chloride, and isopropanol. The surfactants are supplied in this form, with an alcohol and a glycol, to aid in solubilizing the surfactant in water at these high concentrations, and to maintain the as-received concentrate as a homogeneous fluid at low temperatures. In field use, after dilution, the amounts of the other components of the as-received materials are insignificant.

Certain co-surfactants may be useful in extending the brine tolerance, to increase the gel strength, and to reduce the shear sensitivity of VES fluids, in particular for surfactants having shorter side chains, such as BET-O. An example given in U.S. Pat. No. 6,258,859 is sodium dodecylbenzene sulfonate (SDBS, shown below). VES's may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate. These co-surfactants do not interfere with the ability of anionic surfactants to impart pH-recyclable viscoelasticity to zwitterionic surfactants.

SDBS (when x=11 and the counter ion is Na$^+$)

Another type of surfactant that can aggregate into three-dimensional structures that substantially increase viscosity at a certain pH range but not at other pH ranges, is certain cationic surfactants, for example certain quaternary ammonium compounds, in the presence of certain co-surfactants, for example certain organic acids, for example certain carboxylic acids. Examples of suitable quaternary ammonium cationic surfactants and suitable organic acid co-surfactants for these quaternary ammonium cationic surfactants are those described in U.S. Pat. Nos. 5,964,295, and 6,435,277, both of which are assigned to the assignee of the present application and hereby incorporated in their entirety. An example is erucyl bis(2-hydroxyethyl) methyl ammonium chloride with salicylic acid. Not to be limited by theory, but it is believed that such co-surfactants stabilize the aggregated structures that cause these cationic surfactants to gel, but there is an optimal concentration of the anionic form of the co-surfactant for a given concentration of cationic surfactant, and if there is too much anionic form present, the three-dimensional structure is destabilized. Therefore, the system gels at a certain pH or lower but not at a certain pH or higher. (The exact pH's depend upon the choice and concentration of surfactant and co-surfactant and on the other chemicals that might be present; suitable pH values may be determined for each case by simple experiments such as those described below.) In this case it is the surfactant-co-surfactant system that can aggregate into three-dimensional structures that substantially increase viscosity at some pH's but not at others. Again, cycling between the high viscosity and low viscosity states may be repeated.

Simple laboratory tests may be performed to determine suitable concentrations of all materials as a function of the materials and equipment to be used and the temperatures to be encountered. The total viscoelastic surfactant concentration must be sufficient to form a viscoelastic gel under conditions at which the surfactants have sufficient aggregation tendency. In the case of mixed anionic-zwitterionic surfactants, if there is insufficient anionic surfactant, the system is not pH sensitive; if there is more than enough anionic surfactant to provide this property, the system still demonstrates recyclable viscoelasticity as a function of pH, but the overall viscosity is lower.

Generally, a suitable amount of anionic surfactant, when used as the only viscoelastic surfactant, is between about 1 and about 10%; for example from about 3 to about 5%. Such anionic surfactants typically need a salt to gel, for example from about 1 to about 10% of a monovalent salt, for example from about 4 to about 6% KCl. Appropriate amounts of acid and base may be determined by experiment. When used in anionic-zwitterionic surfactant mixtures, a suitable amount of the zwitterionic surfactant is about 2 to about 20%, for example about 4 to about 8%. A suitable amount of the anionic surfactant is from about 0.01 to about 10%, for example about 0.05 to 1%. The ratio of anionic to zwitterionic is from about 0.0015 to about 0.15, for example from about 0.01 to about 0.02. The amount of chelating agent, for example EDTA, is from about 0.1 to about 4%, for example from about 0.2 to about 0.6%. The amount of chelating agent present is that amount sufficient to prevent interference by cations of the action of the anionic surfactant, for example calcium ion, and is dictated by the amount of deleterious cations that might be present. The appropriate amounts of acid and base are those necessary to achieve the desired pH values and can be determined by experiment. Zwitterionic surfactants usually do not need salts to gel; the salt tolerance can also be determined by simple experiments, as shown below in Example 8.

Briefly, a representative anionic surfactant-based VES system is made with oleic acid. A typical fluid formulation is 3% oleic acid, 5% KCl, 1.3% of 30 wt % NaOH and 0.4% ethylenediaminetetraacetic acid. A representative mixed-surfactant based VES system contains 0.1% oleic acid, 6% BET-E-40, 0.4% ethylenediaminetetraacetic acid, 0.15% of 30 wt % NaOH and 2% KCl. At the high pH at which these fluids are formulated, the oleic acid is deprotonated and the fluid forms a VES gel. The fluid is pumped through the coiled tubing for cleanout purposes. The fluid together with entrained particles is then circulated out of the well, and the pH is then adjusted with acid so that the oleic acid is protonated, and the VES fluid loses viscosity and its particle carrying capability. This enables easy separation of sand from the cleanout fluid. A basic solution is then added to the separated fluid so that the fluid pH is raised back above the critical value, resulting in restoration of the rheological properties needed for cleanout. The process can be repeated as many times as needed.

Similarly, a suitable amount of cationic surfactant is between about 1% and about 10%; for example from about 3% to about 5%. A suitable amount of co-surfactant is between about 0.1% and about 2%, for example between about 0.3% and about 0.8%. Again, tolerance for, and optimal amounts of other additives may be determined by simple experiments. The fluid is used as are the anionic and mixed anionic-zwitterionic surfactant systems described above, except of course that the pH changes are in the opposite direction.

In more detail, the fluids of embodiments of the invention are particularly useful for cleaning out wellbores (by "wellbore" we mean open or cased hole or production tubing) at any time between drilling and abandonment. Such wellbores may be vertical, deviated, or horizontal. Particles, such as beads, may be used in jetting operations in wellbores and afterward it may be desirable to remove this material. Produced "sand" (including proppant and/or gravel and/or particles such as silt and clay from the formation) accumulating in the production tubing during fluid flow to the wellbore can greatly restrict hydrocarbon production. Other undesired particulates such as cuttings, cement pieces, fibers, other proppant flowback control agents, fluid loss additives, and debris, including debris formed by perforating, may be present at some stage in the life of a well. In horizontal or deviated wells, undesired fluids, that may or may not contain solid particles, may accumulate in low spots. Coiled tubing (CT) has been widely used as a means to clean out materials from a wellbore. Fluids used for coiled tubing cleanout should have low friction pressure (to minimize hydraulic horsepower requirements) and sufficient viscosity for good material carrying and/or displacing capability to aid in carrying and/or displacing the material to the surface for disposal. Normally, light fluids are preferred to reduce the possibility of fracturing and to minimize the hydraulic horsepower needed to return the fluid to the surface.

VES fluid systems are advantageously used for coiled tubing cleanout applications, in particular in horizontal or inclined wellbores, for a number of reasons: VES fluids have superior drag reduction properties (that is, low friction pressures); they can be foamed to reduce fluid density; they generally undergo "disruptive shear thinning" at high shear rates (high flow rates and/or great turbulence in the tubing) which reduces the horsepower required to pump them down the CT; the very low viscosity fluid that has undergone disruptive shear thinning can enter a sand mass and pick the sand up easily; and since they recover viscosity quickly, the sand remains suspended as it is moved back up the wellbore. Normally in CT cleanout operations, the cleanout fluid is pumped down the CT, out through a specialized nozzle or nozzles at the end of the CT and into the wellbore, and then up through the annulus between the CT and the wellbore. The cleanout fluid fluidizes the particulate material and entrains it and carries it to the surface. (In a "reverse cleanout" operation, the fluid is circulated down through the annulus and up through the CT; in that case no nozzles are used.) In either case, the process is preferentially carried out pressure-balanced to minimize fluid loss to the formation. When the fluid containing entrained particulates reaches the surface, the particulates have previously been removed by a device such as a sieve-shaker (shale shaker) or a centrifuge (hydrocyclone). Simply waiting for the particles to separate out is not normally a suitable commercial option because it takes too long in the viscous fluid needed to carry the particles to the surface. However, in the methods of the present invention, when the fluid reaches the surface, a small volume of acid or base is added and the viscosity very quickly drops to a level at which the particles settle out acceptably quickly by gravity. After the particles have settled out and been separated from the fluid, a small amount of base or acid is added to change the pH so that the fluid can function as a cleanout fluid, and the fluid is re-injected and the process is repeated.

Thus, a suitable higher viscosity is the viscosity necessary to fluidize the particles present downhole and entrain them and carry them to the surface. This depends among other factors upon the relative densities of the particles and the fluid, and on the flow rates at the nozzle and in the annulus. A suitable lower viscosity is a viscosity at which the particles settle from the fluid at the surface in a time short enough so that additional mechanical devices such as sieve shakers and centrifuges are not needed. This depends among other factors upon the relative densities of the particles and the fluid, the residence time of the fluid in the settling tank (dependent for example on the flow rate and tank capacity) and the time and the removal effectiveness the operator considers satisfactory. In general a viscosity of at least about 50 cP (all viscosities are given here at a shear rate of 100 $sec^{-1}$), for example at least about 100 cP, is suitable for fluidizing and entraining particles in a cleanout operation. An upper limit might be based on minimizing unnecessary expenditure of hydraulic horsepower in pumping. In general a viscosity of less than about 50 cP, for example less than about 20 cP, is suitable for particle settling.

Another property of viscoelastic surfactant-based systems is their shear sensitivity. For instance, in the oil industry, it is often favorable to provide fluids that exhibit high viscosity at little or no shear and low viscosity at high shear. Such fluids are easy to pump but are highly viscous in lower-shear environments. Though the shear-sensitivity is an intrinsic property of most viscoelasfic systems, an independent aspect is the degree of viscosity-recovery or re-healing once the fluid is no longer subjected to high shear. Controlling the degree of reassembling (re-healing) is necessary to maximize performance of the surfactant system for different applications. For example, in hydraulic fracturing it is critical for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to more efficiently "jet" the solids from the bottom of the wellbore into the annulus. Once in the annulus the regained viscosity ensures that the solids are effectively transported to the surface. Shear recovery agents, for example sodium polynaphthalene sulfonate, and sodium lignosulfate, may therefore be added, again provided that they are compatible and non-interfering.

In wellbore cleanouts, solid additives are normally not included in the cleanout fluids because they are removed when the particles are taken out of the fluid at the surface. However, if necessary, fluid loss additives may be included as may fibers that improve the ability of a fluid to entrain other particles. These may be selected to be of such low density that they are not removed in the settling stage, or they may be removed and then fresh portions added in subsequent stages. Currently used fibers do not pass through currently used nozzles but may be used in reverse cleanouts. The components of the cleanout fluid are batch-mixed or mixed on the fly. Mixing on the fly is preferred, but if batch mixing is used, any combination of components may be premixed in a concentrate or slurry for delivery to the job site.

Although the uses have been described in terms of producing wells for oil and/or gas, the fluids and methods may also be used for injection wells (such as for enhanced recovery or for storage) or for production wells for other fluids such as carbon dioxide or water.

In the experiments described below, the oleic acid used as the anionic surfactant was obtained, and used, as a blend of about 89% oleic acid and 11% acetic acid (called "oleic acid"). The oleic acid is supplied commercially with acetic acid present; the acetic acid is not necessary for the fluids of the invention. The zwitterionic surfactant used in the experiments was BET-E40, as received as described above, containing about 1% of DAXAD 17, a low molecular weight sodium polynaphthalene sulfonate available from Hampshire Chemical Corporation, Nashua, N.H., USA, except that there was no DAXAD 17 present in the experiments of Example 7. The chelating agent used in the experiments was 39 wt % tetrasodium ethylenediaminetetraacetic acid in water with trace amounts of the di- and trisodium salts and byproducts of the manufacture (called "EDTA").

EXAMPLE 1

Figure 1:
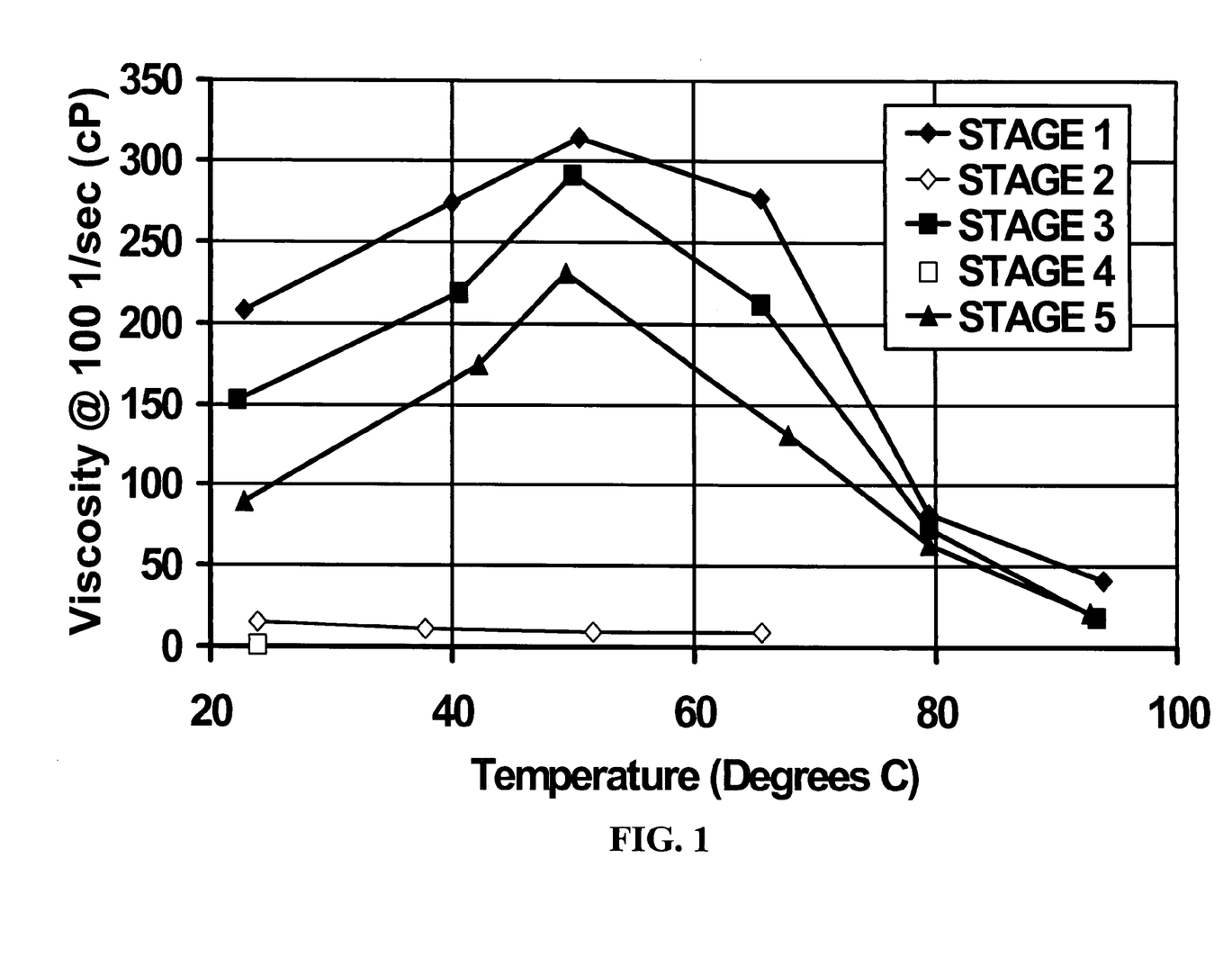
FIG. 1 shows the recycling of the viscosity of an anionic surfactant based viscoelastic fluid as a function of temperature with sodium hydroxide as the base and hydrochloric acid as the acid.

A 100 ml solution was made up in water with 4% oleic acid, 5% KCl, 0.4% EDTA and 2.5% of 30 wt % NaOH. The fluid had a pH of 12.62 and was a viscoelastic gel. The viscosity of this fluid as a function of temperature is shown in FIG. 1 as "Stage 1". The fluid was then cooled and 0.75 ml of 37 wt % HCl was added; the fluid had a pH of 9.39 and very low viscosity, which is shown in FIG. 1 as "Stage 2". The fluid was then cooled and 0.90 ml of 30 wt % NaOH was added; the fluid had a pH of 12.55 and was once again a viscous gel, which is shown in FIG. 1 as "Stage 3". The fluid was then cooled and 0.75 ml of 37 wt % HCl was added; the fluid had a pH of 9.07 and very low viscosity, which is shown in FIG. 1 as "Stage 4". The fluid was then cooled and 0.90 ml of 30 wt % NaOH was added; the fluid had a pH of 12.57 and was once again a viscous gel, which is shown in FIG. 1 as "Stage 5". It is apparent that the fluid was repeatedly cycled between a fluid that could transport wellbore debris and a fluid from which the debris could be removed easily. This fluid had very low viscosity at the lower pH values, but gradually lost viscosity after repeated cycles. Not to be limited by theory, but it is believed that the slow build up of NaCl gradually decreased the high-pH viscosity.

EXAMPLE 2

Figure 2:
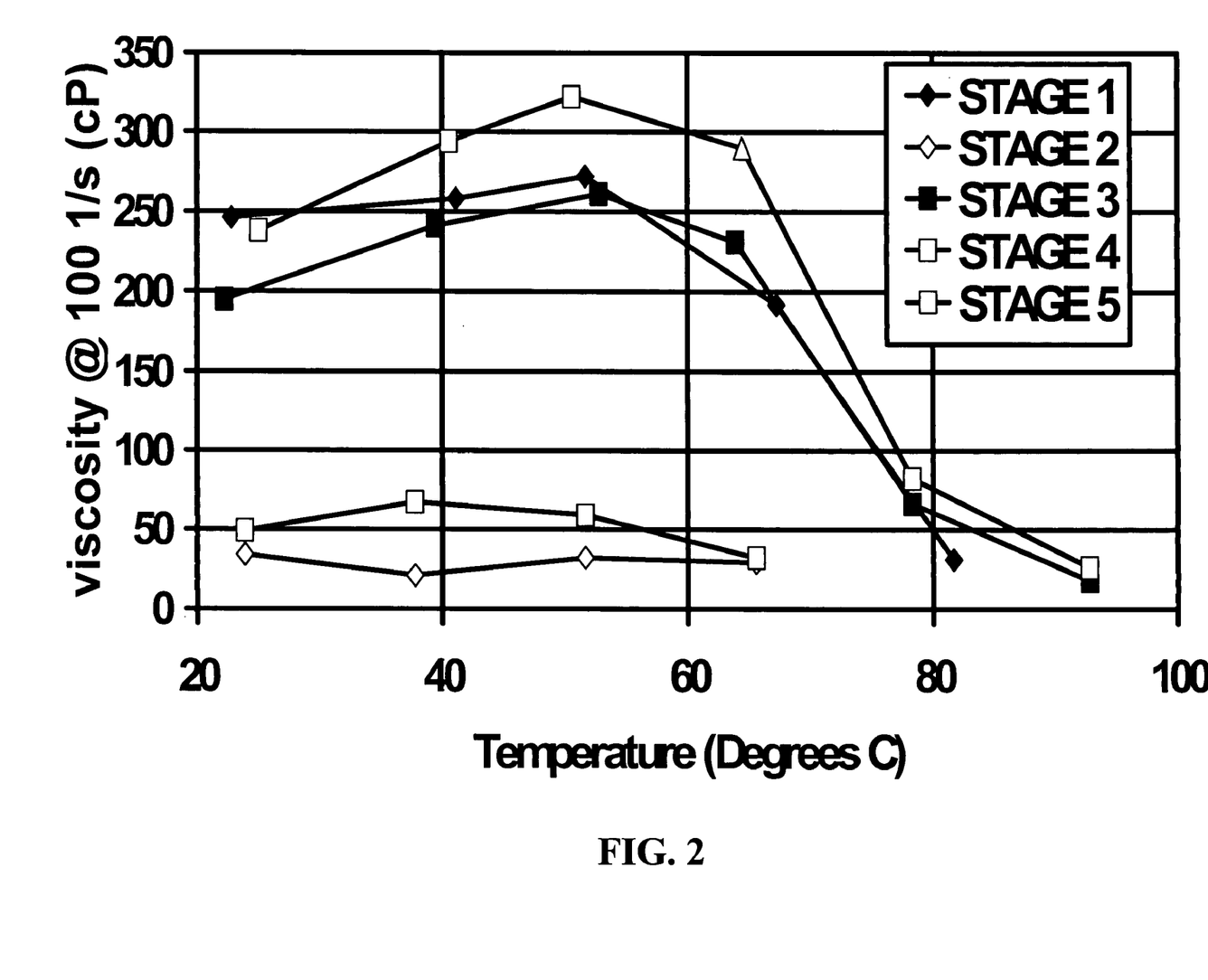
FIG. 2 shows the recycling of the viscosity of an anionic surfactant based viscoelastic fluid as a function of temperature with potassium hydroxide as the base and hydrochloric acid as the acid.

A 100 ml solution was made up in water with 4% oleic acid, 5% KCl, 0.4% EDTA and 2% of 45 wt % KOH. The fluid had a pH of 12.61 and was a viscoelastic gel. The viscosity of this fluid as a function of temperature is shown in FIG. 2 as "Stage 1". The fluid was then cooled and 0.65 ml of 37 wt % HCl was added; the fluid had a pH of 9.35 and very low viscosity, which is shown in FIG. 2 as "Stage 2". The fluid was then cooled and 0.85 ml of 45 wt % KOH was added; the fluid had a pH of 12.76 and was once again a viscous gel, which is shown in FIG. 2 as "Stage 3". The fluid was then cooled and 0.65 ml of 37 wt % HCl was added; the fluid had a pH of 9.46 and very low viscosity, which is shown in FIG. 2 as "Stage 4". The fluid was then cooled and 0.85 ml of 45 wt % KOH was added; the fluid had a pH of 12.78 and was once again a viscous gel, which is shown in FIG. 2 as "Stage 5". It is apparent that the fluid was repeatedly cycled between a fluid that could transport wellbore debris and a fluid from which the debris could be removed easily. This fluid had very low viscosity at the lower pH values (slightly higher than in the analogous experiment in Example 1 using NaOH), but gradually lost viscosity after repeated cycles (although not as much as in the analogous experiment of Example 1 using NaOH). Not to be limited by theory, but it is believed that the slow build up of KCl gradually decreased the high-pH viscosity, but not as much as NaOH did in Example 1. It is also noted by comparing Examples 1 and 2, that the low pH viscosity was lower when NaOH was used than when KOH was used.

EXAMPLES 3 AND 4

Figure 3:
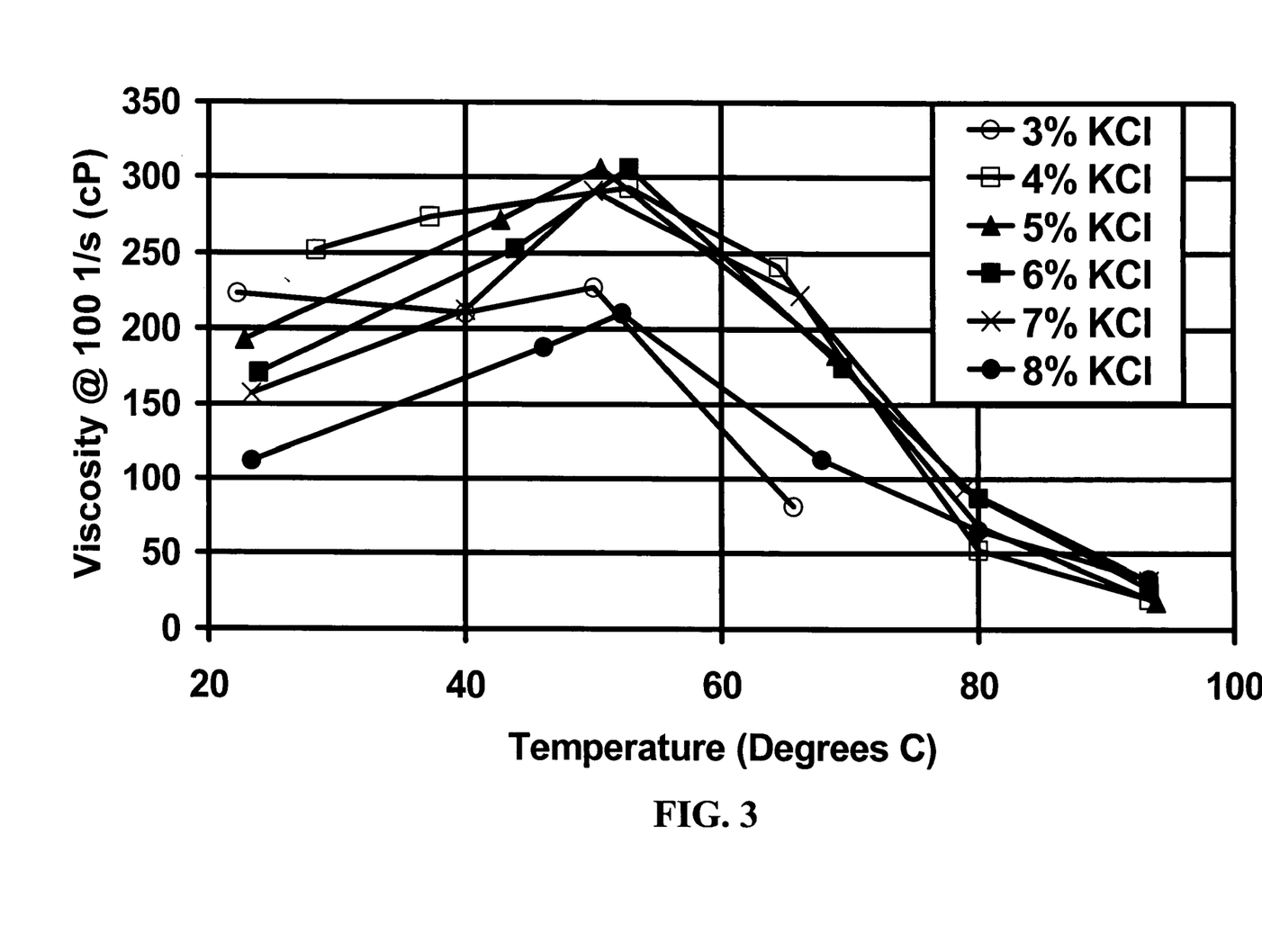
FIG. 3 shows the viscosity of an anionic surfactant based viscoelastic fluid as a function of temperature with sodium cations present in varying amounts of potassium chloride.
Figure 4:
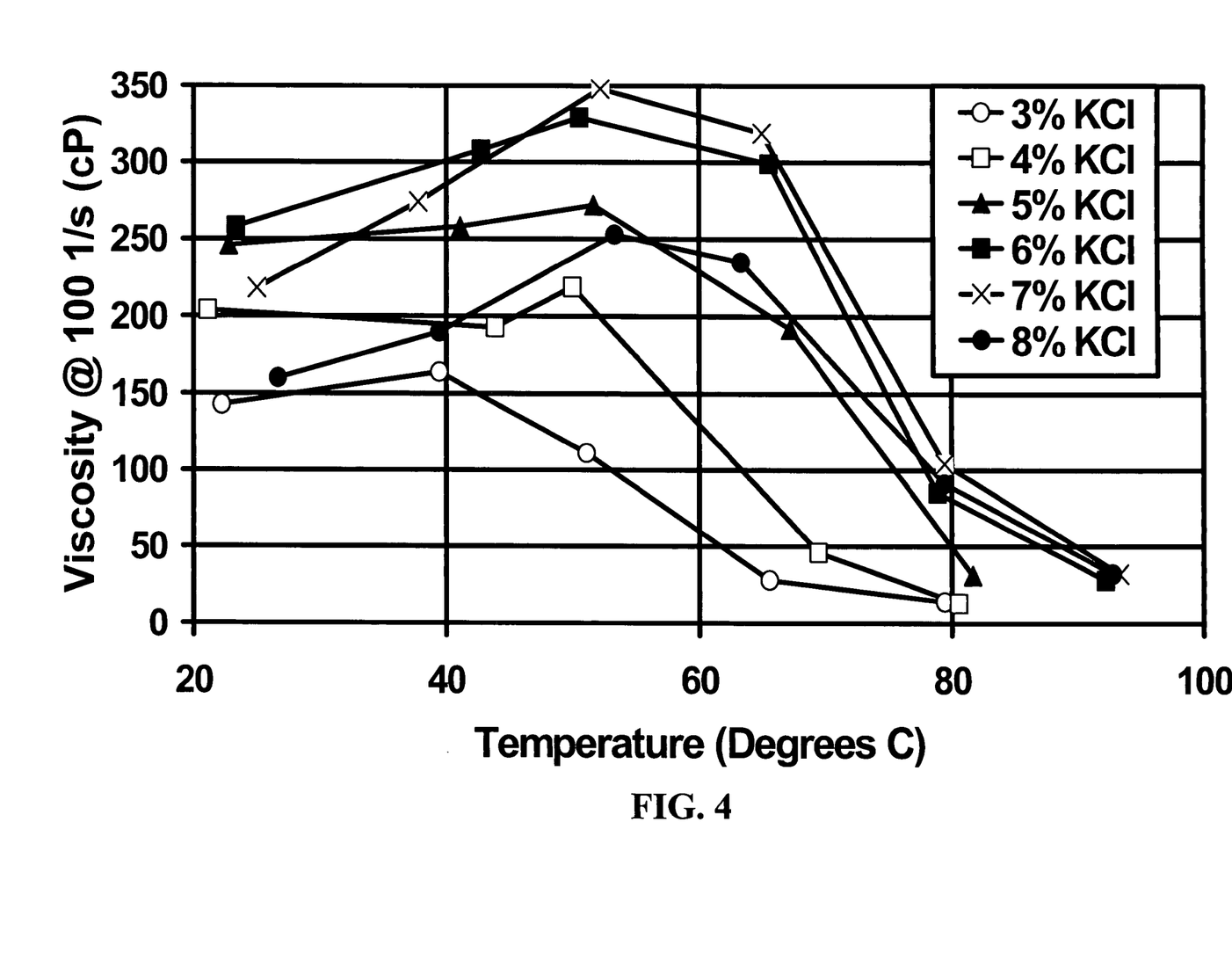
FIG. 4 shows the viscosity of an anionic surfactant based viscoelastic fluid as a function of temperature without sodium cations present in varying amounts of potassium chloride.

Two sets of fluids were prepared. In the first set, the fluid was made up in water with 4% oleic acid, 0.4% EDTA, 2.5% of 30 wt % NaOH, and varying amounts (3%, 4%, 5%, 6%, 7%, and 8%) of KCl. The viscosity as a function of temperature of these fluids is shown in FIG. 3. In the second set, the fluid was made up in water with 4% oleic acid, 0.4% EDTA, 2% of 45 wt % KOH, and varying amounts (3%, 4%, 5%, 6%, 7%, and 8%) of KCl. The viscosity as a function of temperature of these fluids is shown in FIG. 4. It can be seen that there is an optimal KCl concentration and useful concentration range for each fluid and that the effect of an increase in KCl depends somewhat on whether there was initially any Na ion present. Simple experiments of this type should be used to optimize the compositions and methods of the invention as a function of the choice and concentrations of surfactant, salt, acid, and base to be used.

EXAMPLE 5

Figure 5:
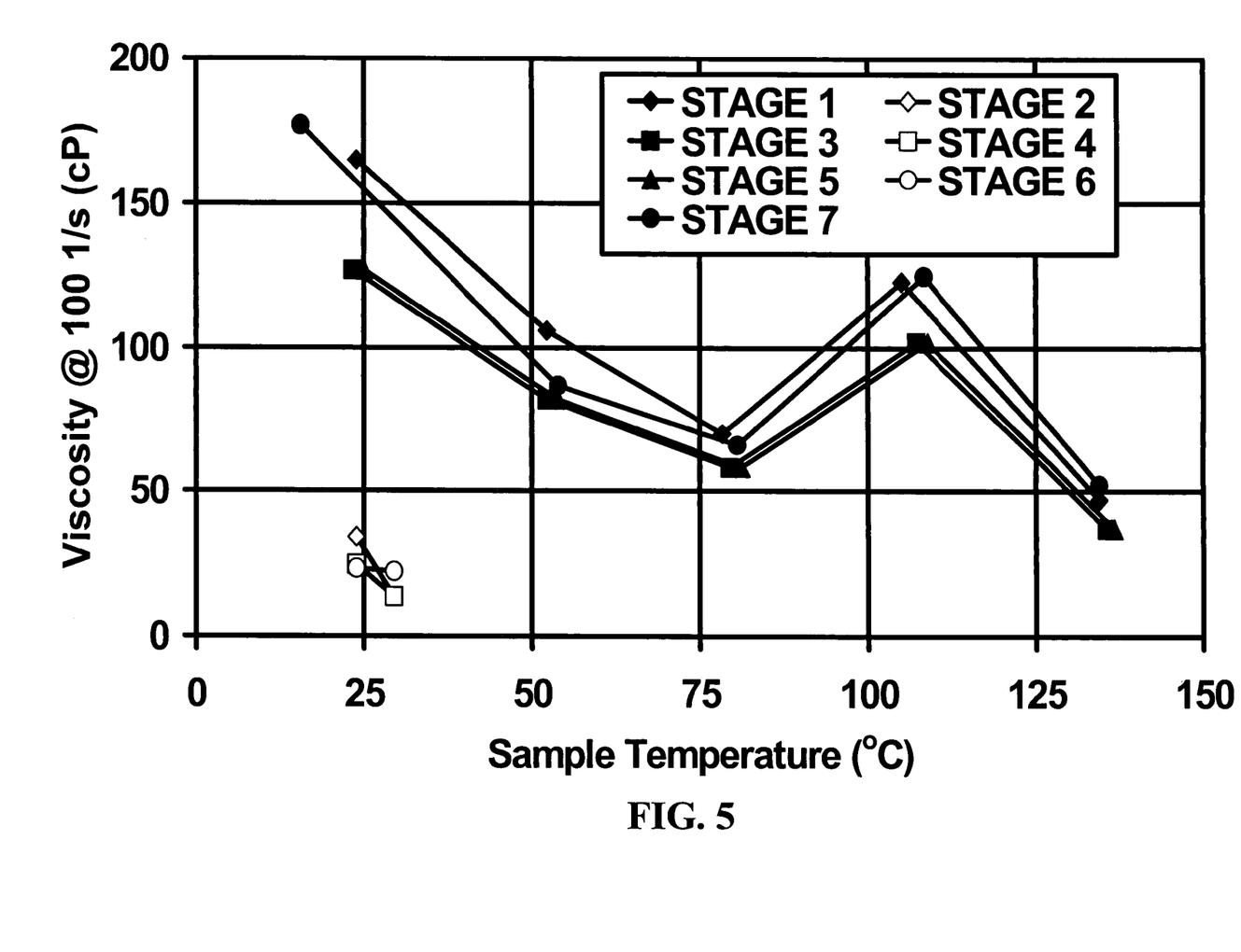
FIG. 5 shows the recycling of the viscosity of a mixed anionic-zwitterionic surfactant based recyclable viscoelastic fluid as a function of temperature with sodium hydroxide as the base and hydrochloric acid as the acid.

Experiments analogous to those of Examples 1 and 2 were done starting with a fluid prepared in 250 ml of water with 6% BET-E-40, 0.1% oleic acid, 2% KCl, 0.4% EDTA and 0.15% of 30 wt % NaOH. The fluid had a pH of 11.95 and was a viscoelastic gel. The viscosity of this fluid as a function of temperature is shown in FIG. 5 as "Stage 1". The fluid was then cooled and 1.32 ml of 37 wt % HCl was added; the fluid had a pH of 3.03 and very low viscosity, which is shown in FIG. 5 as "Stage 2". The fluid was then cooled and 1.38 ml of 30 wt % NaOH was added; the fluid had a pH of 12.00 and was once again a viscous gel, which is shown in FIG. 5 as "Stage 3". The fluid was then cooled and 1.25 ml of 37 wt % HCl was added; the fluid had a pH of 2.80 and very low viscosity, which is shown in FIG. 5 as "Stage 4". The fluid was then cooled and 1.39 ml of 30 wt % NaOH was added; the fluid had a pH of 11.98 and was once again a viscous gel, which is shown in FIG. 5 as "Stage 5". The fluid was then cooled and 1.25 ml of 37 wt % HCl was added; the fluid had a pH of 2.99 and very low viscosity, which is shown in FIG. 5 as "Stage 6". The fluid was then cooled and 1.40 ml of 30 wt % NaOH was added; the fluid had a pH of 12.00 and was once again a viscous gel, which is shown in FIG. 5 as "Stage 7". It is apparent that the fluid was repeatedly cycled between a fluid that could transport wellbore debris and a fluid from which the debris could be removed easily.

EXAMPLE 6

Figure 6:
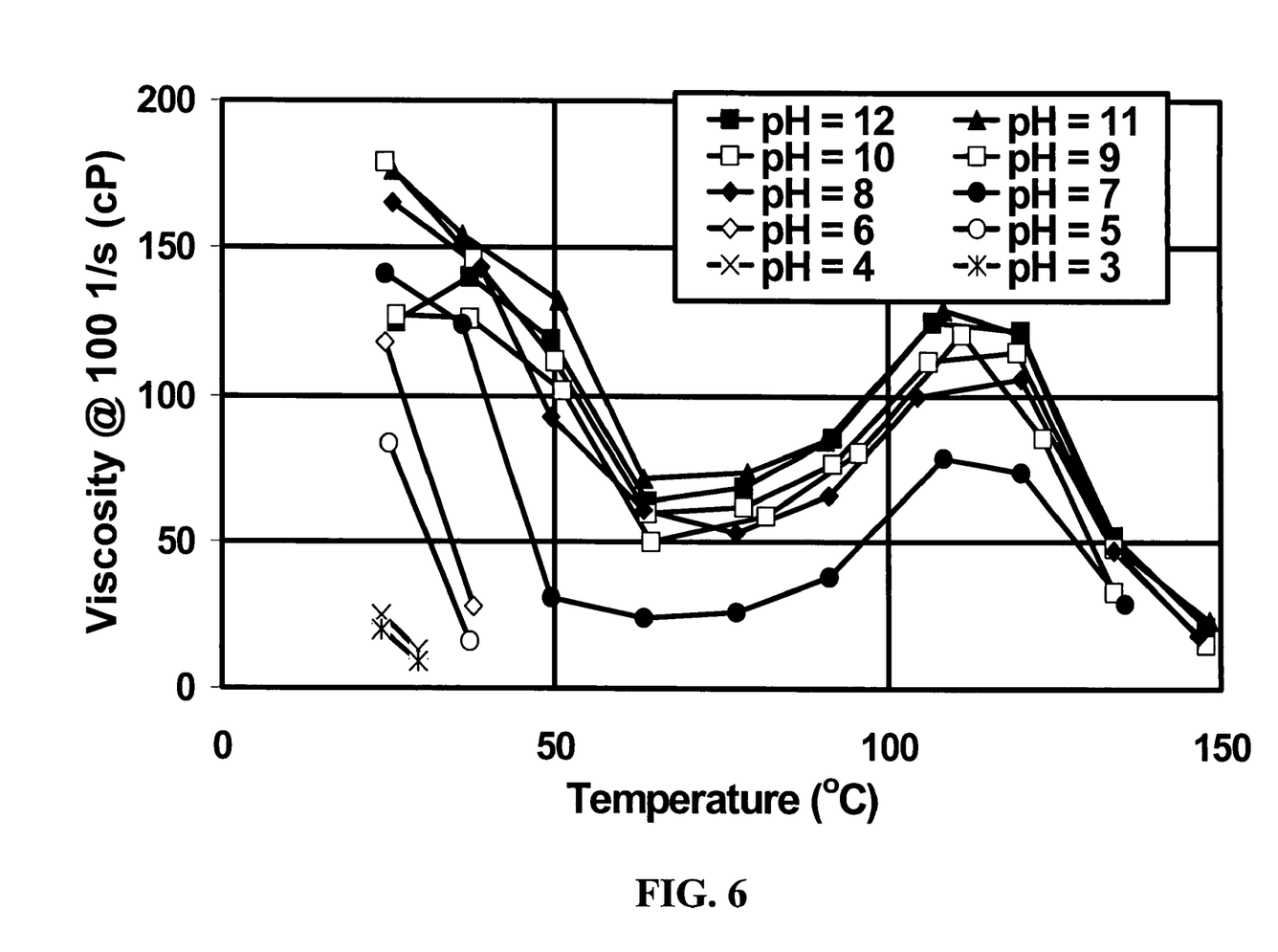
FIG. 6 shows the viscosity of a mixed anionic-zwitterionic surfactant based recyclable viscoelastic fluid as a function of temperature at various pH values.

Experiments were performed to determine the viscosity as a function of temperature of a fluid prepared in water with 6% BET-E-40, 0.1% oleic acid, 2% KCl, 0.4% EDTA, 0.15% of 30 wt % NaOH and the amounts of 37% HCl necessary to adjust the pH. The results are shown in FIG. 6. It can be seen that for this particular fluid composition, the surfactant mixture retains useful viscosity under basic conditions up to its best upper temperature limit. The pH should be below about 4 before the ambient temperature viscosity is low enough to allow settling of entrained and transported particles. The exact pH/temperature/viscosity profile depends upon the choice and concentration of all components and can easily be determined by experiments such as these.

EXAMPLE 7

Figure 7:
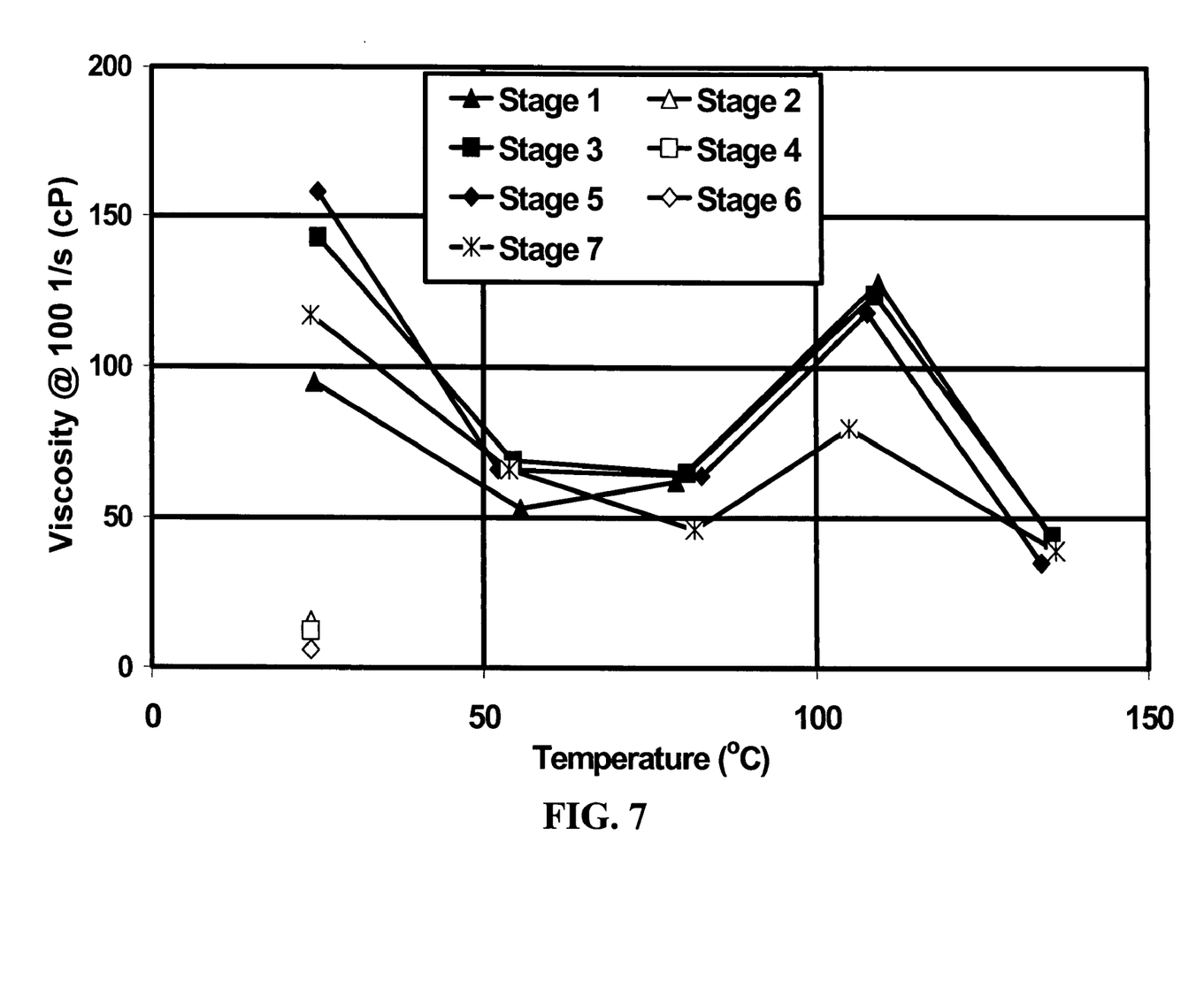
FIG. 7 shows the recycling of the viscosity of a mixed anionic-zwitterionic surfactant based viscoelastic fluid as a function of temperature with sodium hydroxide as the base and hydrochloric acid as the acid.

An experiment analogous to that of Example 5 was done to show that the polynaphthalene sulfonate additive is not necessary. The experiment started with a fluid prepared in 250 ml of water with 6% BET-E-40 (as before except without the polynaphthalene sulfonate), 0.1% oleic acid, 2% KCl, 0.4% EDTA and 0.18% of 30 wt % NaOH. The fluid had a pH of 12.00 and was a viscoelastic gel. The viscosity of this fluid as a function of temperature is shown in FIG. 7 as "Stage 1". The fluid was then cooled and 1.25 ml of 37% HCl was added; the fluid had a pH of 3.06 and very low viscosity, which is shown in FIG. 7 as "Stage 2". The fluid was then cooled and 1.27 ml of 30 wt % NaOH was added; the fluid had a pH of 11.98 and was once again a viscous gel, which is shown in FIG. 7 as "Stage 3". The fluid was then cooled and 1.25 ml of 37% HCl was added; the fluid had a pH of 3.07 and very low viscosity, which is shown in FIG. 7 as "Stage 4". The fluid was then cooled and 1.40 ml of 30 wt % NaOH was added; the fluid had a pH of 12.03 and was once again a viscous gel, which is shown in FIG. 7 as "Stage 5". The fluid was then cooled and 1.40 ml of 37% HCl was added; the fluid had a pH of 2.94 and very low viscosity, which is shown in FIG. 7 as "Stage 6". The fluid was then cooled and 1.37 ml of 30 wt % NaOH was added; the fluid had a pH of 11.91 and was once again a viscous gel, which is shown in FIG. 7 as "Stage 7". It is apparent that this fluid was repeatedly cycled between a fluid that could transport wellbore debris and a fluid from which the debris could be removed easily.

EXAMPLE 8

Figure 8:
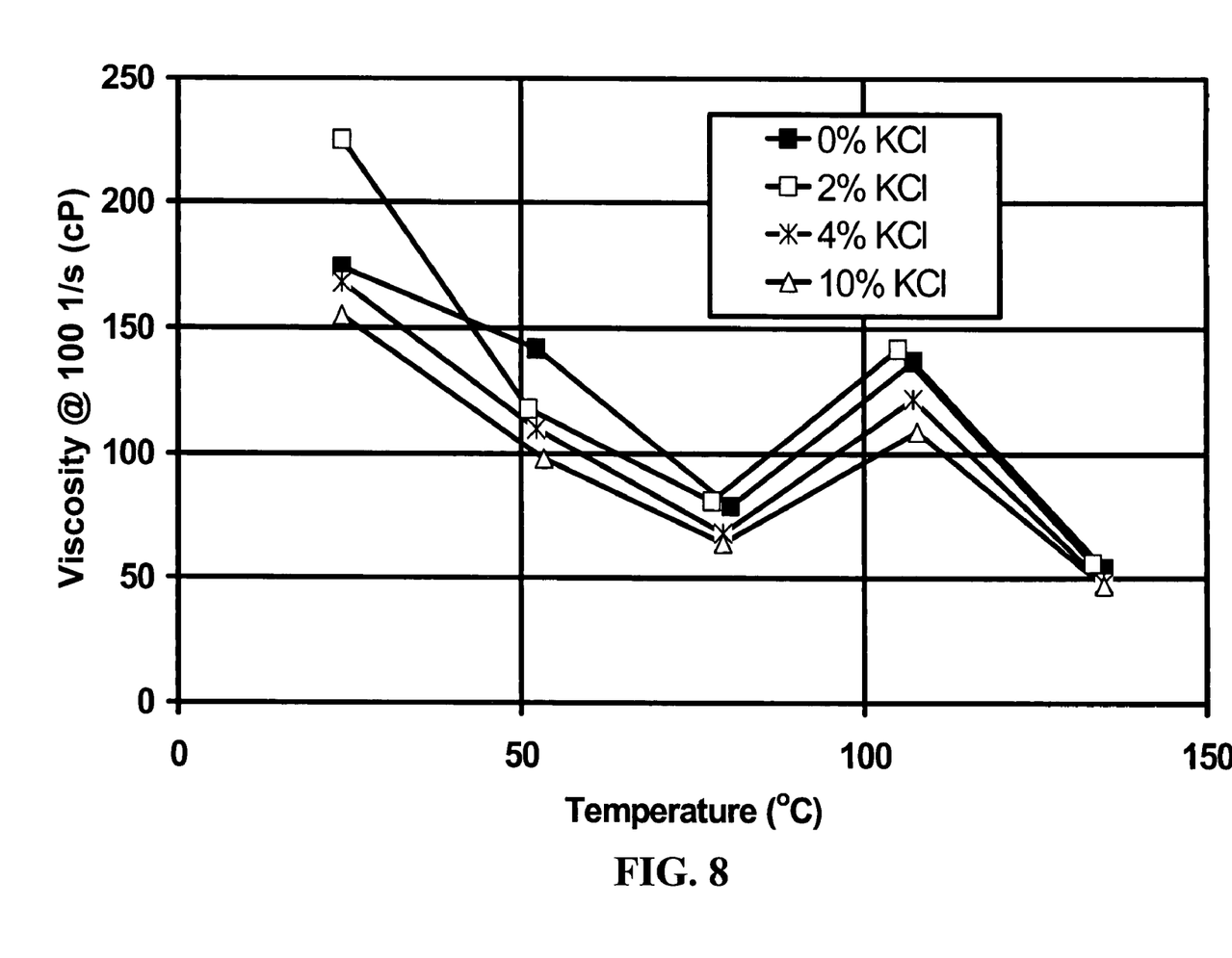
FIG. 8 shows the viscosity of a mixed anionic-zwitterionic surfactant based recyclable viscoelastic fluid as a function of temperature at various KCl concentrations.

To show the salt tolerance of the system, experiments were performed with starting fluids made up with 6% BET-E-40, 0.1% oleic acid, 0.4% EDTA, and varying amounts of KCl. The viscosities of these fluids are shown as a function of temperature in FIG. 8. Up to at least 10% KCl, the added salt had little effect on the viscosities.

EXAMPLE 9

Figure 9:
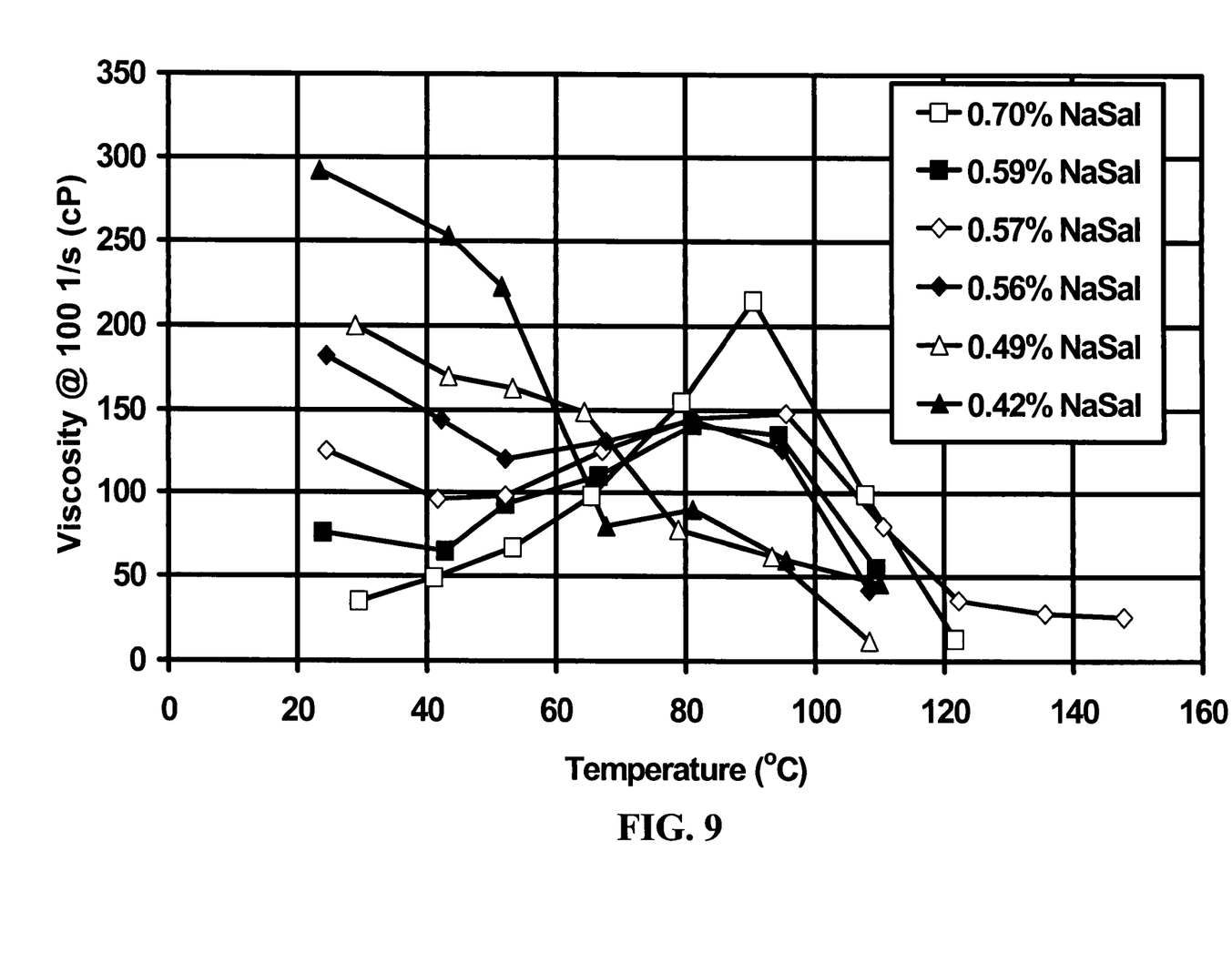
FIG. 9 shows the viscosity of a cationic surfactant based recyclable viscoelastic fluid as a function of temperature at various co-surfactant concentrations.

Experiments were done with an aqueous solution containing 5% of a cationic surfactant concentrate containing about 60% erucyl bis(2-hydroxyethyl) methyl ammonium chloride in about 15% propane-1,2-diol, about 20% isopropanol, and about 5% water; to this was added 1% tetramethyl ammonium chloride and varying amounts of sodium salicylate. No additional acid, base or buffer was added. Viscosities as a function of temperature are shown for these mixtures in FIG. 9. It can be seen that with increasing amounts of sodium salicylate added, the ambient-temperature viscosities of the mixtures decreased.

EXAMPLE 10

Figure 10:
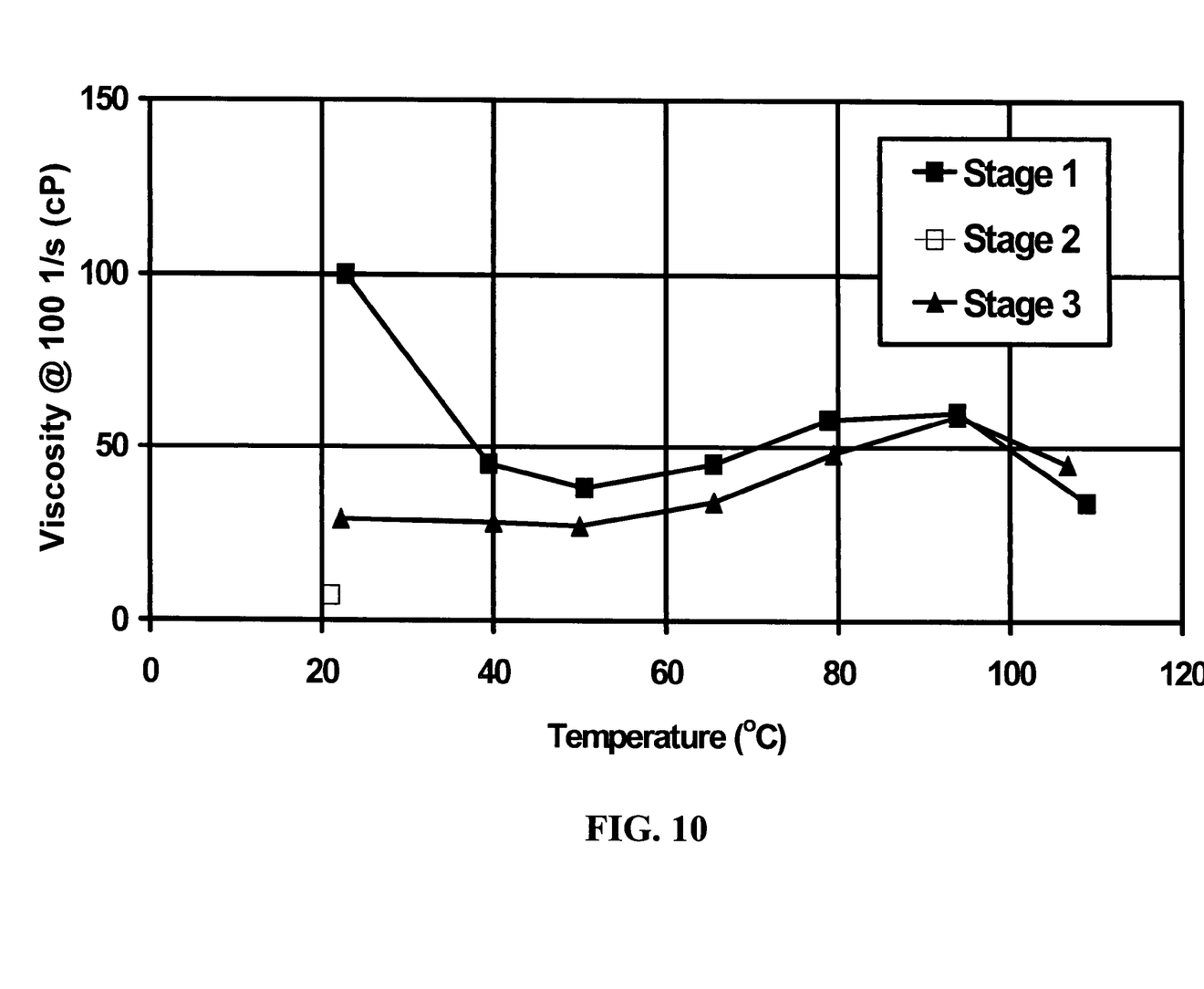
FIG. 10 shows the recycling of the viscosity of a cationic surfactant based recyclable viscoelastic fluid with co-surfactant as a function of temperature with potassium hydroxide as the base and hydrochloric acid as the acid.

An aqueous solution was prepared containing 0.42% sodium salicylate and 3% of a cationic surfactant concentrate containing about 60% erucyl bis(2-hydroxyethyl) methyl ammonium chloride in about 15% propane-1,2-diol, about 20% isopropanol. The pH of this solution was 7.60; the viscosity is shown as a function of temperature in FIG. 10 as "Stage 1". To this was added sufficient 45% KOH to increase the pH to 11.69; the resulting system had very low viscosity ("Stage 2" on FIG. 10). The fluid was cooled and sufficient HCl was added to lower the pH to 7.13; the system once again became a viscous gel. The viscosity is shown as a function of temperature in FIG. 10 as "Stage 3". The fluid system was cycled between a viscous gel and a low-viscosity fluid by changing the pH.

What is claimed is:

1. A method of cleaning particles from a wellbore comprising a) injecting into said wellbore an aqueous fluid comprising an anionic surfactant, wherein said fluid has a viscosity of at least about 50 cP and a pH of at least about 5, b) moving said aqueous fluid within said wellbore such that said fluid entrains said particles, c) bringing said fluid to the surface, d) and reducing the pH of said fluid to below about 4 wherein said particles are allowed to settle from said fluid.

2. The method of claim 1 further wherein after step d) the pH of said fluid is increased to above about 5, and then steps a) through d) are repeated.

3. The method of claim 1 wherein said anionic surfactant comprises a fatty acid.

4. The method of claim 3 wherein said fatty acid comprises oleic acid.

5. The method of claim 1 further wherein said fluid further comprises a zwitterionic surfactant.

6. The method of claim 5 wherein said zwitterionic surfactant comprises a betaine.

7. The method of claim 6 wherein said betaine comprises erucic amidopropyl dimethyl betaine.

8. The method of claim 1 further wherein said fluid comprises a chelating agent for divalent or trivalent cations.

9. The method of claim 8 wherein said chelating agent comprises ethylenediaminetetraacetate or a salt thereof.

10. A method of cleaning particles from a wellbore comprising a) injecting into said wellbore an aqueous fluid comprising a cationic surfactant, wherein said fluid has a viscosity of at least about 50 cP and a pH of less than about 8, b) moving said aqueous fluid within said wellbore such that said fluid entrains said particles, c) bringing said fluid to the surface, d) and increasing the pH of said fluid to above about 10 wherein said particles are allowed to settle from said fluid.

11. The method of claim 10 further wherein after step d) the pH of said fluid is decreased to less than about 8, and then steps a) through d) are repeated.

12. The method of claim 10 wherein said cationic surfactant comprises a quaternary ammonium cationic surfactant.

13. The method of claim 12 wherein said quaternary ammonium cationic surfactant comprises erucyl bis(2-hydroxyethyl) methyl ammonium chloride.

14. The method of claim 10 further wherein said fluid further comprises a carboxylic acid co-surfactant.

15. The method of claim 14 wherein said carboxylic acid co-surfactant comprises salicylic acid.

* * * * *